Aug. 28, 1934.　　　J. T. BALDWIN　　　1,971,633
PROCESS OF TREATING OIL GELS AND PRODUCT THEREFROM
Filed Nov. 24, 1930
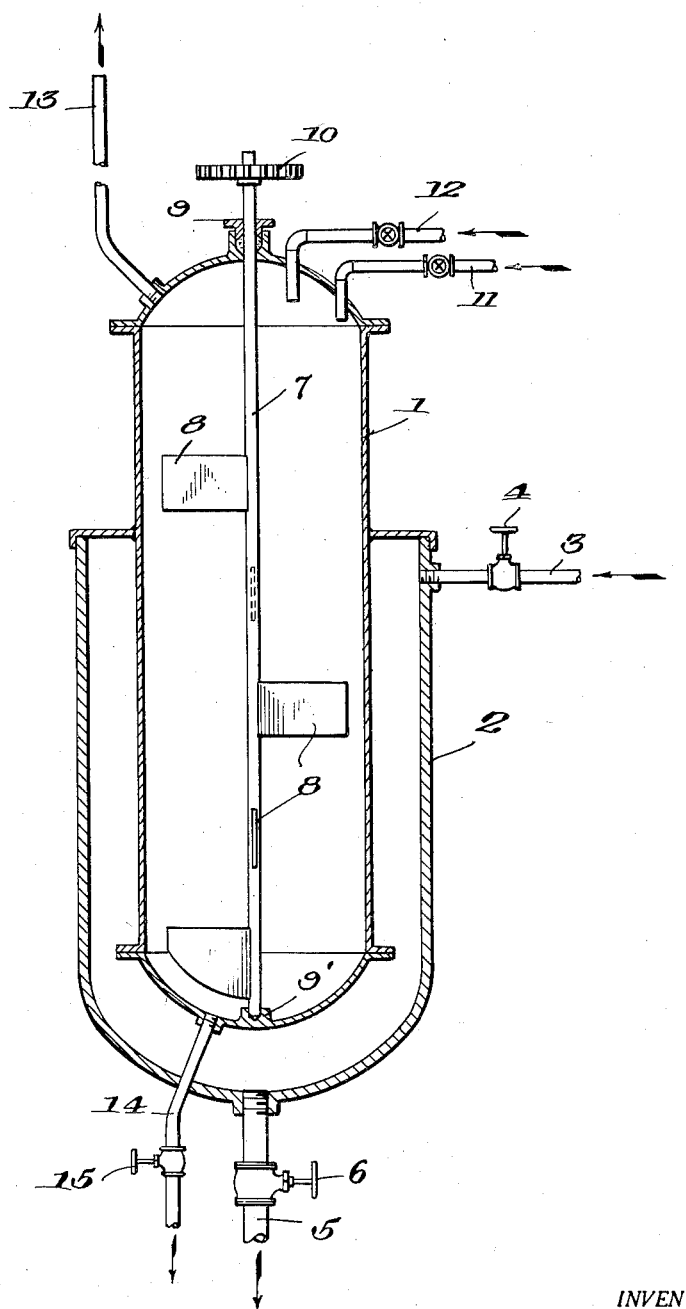
INVENTOR.
Julian T. Baldwin
BY
Stone, Boyden, Mack & Hahn
ATTORNEYS.

Patented Aug. 28, 1934

1,971,633

UNITED STATES PATENT OFFICE 1,971,633

PROCESS OF TREATING OIL GELS AND PRODUCT THEREFROM

Julian T. Baldwin, West Chester, Pa.

Application November 24, 1930, Serial No. 497,947

14 Claims. (Cl. 134—26)

This invention relates to materials for liquid and plastic coating compositions, and to new products and the procedure for making them. It pertains particularly to dispersions of oil gels, especially highly oxidized oil gels, suitable for use as coating compositions, either by themselves, or incorporated with nitro-cellulose lacquers, vinyl ester lacquers, oil varnishes, etc., or as raw materials for synthetic resin manufacture or as liquid vehicles for linoleum ingredients, and it further relates to the production of an improved scrim oil therefrom.

When linseed oil or other drying oils dry, they form a solid elastic mass which is called a gel. This gel is considered insoluble. Parts of it may be extracted with powerful solvents, the amount capable of being extracted depending on the degree of hardening or oxidation of the oil, highly oxidized oil gels having less extractible matter than those only partially oxidized.

Oxidized "scrim oil" used in linoleum manufacture has only a portion of its matter extractible with powerful solvents, and one of the control tests applied thereon consists in extracting the "scrim oil" in a refluxing apparatus for three days with toluol and with petroleum ether. For example, a good "scrim oil" containing 40% matter extractible with toluol and 20% extractible with petroleum ether, has 60% and 80% of its matter insoluble after this drastic treatment. This latter portion is referred to as the insoluble part, and has apparently not been dissolved.

The oxidized oil, however, if it could be made to completely dissolve, could be made into a solution or dispersion suitable as a vehicle for paints, and such paints would dry by evaporation, largely, since the oil would be already oxidized. The paint could then be first dried under scientifically controlled conditions, then applied to the surface to be painted.

It has been discovered that the problem of dissolving or dispersing the so-called insoluble oil gels can be solved by subjecting the gel to pressure in the presence of a dispersing agent or medium. The pressure may be mechanical or vapor pressure. The pressure, if mechanical, may be applied by passing a mixture of the gel and dispersing agent through a pair, or a plurality of pairs, of grinding rolls as they are known in the linoleum industry. A number of passes through the rolls are requisite for securing the thorough dispersion of the gel. The finest dispersions of the gel are obtained by the use of vapor pressure, although the gel may be subjected first to mechanical pressure, then to vapor pressure, then again to mechanical pressure, so that the gel is subjected to mechanical pressure both before and after the vapor pressure treatment.

When vapor pressure is used the procedure is as follows: 700 grams of scrim oil that is ground, and 1500 grams of ethyl alcohol-toluol mixture (equal parts of each solvent) are placed in an aluminum, tantalum, or acid resisting alloy lined autoclave which is then closed. Heat is applied so that the temperature of the autoclave is maintained from 205° to 220° F. or at such a temperature that a pressure of 15 lbs. per square inch is created within the autoclave. This is maintained for 70 hours. At the end of this time the average scrim oil will be dispersed in the solvent. If linoleum cement (scrim oil fused with resin) is used to replace the scrim oil in this example, the dispersion takes place somewhat easier, since the resin fused with the oil gives the dispersing agent a point of attack on the oil gel. If the oil is unusually hard a longer treatment is necessary. Other solvents may be used as: ethyl acetate, benzol, ether, or acetone. Water white petroleum fractions distilling from 150° F. to 220° F. are satisfactory in the case of soft oil gels. The scrim oil may be finely ground on roller mills before adding the solvents or while a part of the solvent is being added to it.

The time, temperature and pressure required to complete the dispersion depends on (1) the hardness of the oil gel, (2) the effective solvent power or dispersing power of the solvent, (3) the vapor pressure curve of the solvent, (4) the degree of dispersion desired, (5) the acid resistance of the material lining the autoclave has a slight effect. The harder the gel and the greater the cohesion between its particles the more time, pressure or temperature is required. The dispersing power of ethyl alcohol is greater and somewhat different in nature from that of toluol, which gives more viscous solutions. The vapor pressure-temperature of alcohol is also different from that of toluol, alcohol developing pressure more rapidly than toluol. Consequently toluol requires a higher temperature to disperse an oil gel than alcohol. The pressure required in both cases does not vary to as large a degree. When a high cooking pressure is used, much less time is required. Thus a gel required 70 hours at 15 lbs. per square inch would take only a few minutes at 200 lbs. per square inch.

Water though a non-solvent for oils will act as a de-gelling agent. A specific example of its use is: 700 grams of ground scrim oil and 1000–1300 grs. of water are placed in an autoclave and heat is applied for an hour at such a rate that at the end of that time a pressure of 220 lbs. per square inch will be obtained. The autoclave is allowed to cool. After cooling, the water may be decanted from the scrim oil which forms the bottom layer and has been transformed into a viscous liquid which may be thinned with toluol, alcohol, acetone or butyl acetate. The product made by cooking under pressure with water differs from that in which solvent is used as the dispersing agent in that the water removes some of the decomposition products. The films made by baking the water produced product are less durable and more brittle than the products made with solvents.

Other gels besides those which are secured primarily by oxidation may be dispersed by this treatment. Thus oils, including non-drying oils, gelled by sulfur or sulfur chloride may be dispersed by this treatment. China-wood oil gelled by ferric chloride or by heat treatment may be dispersed. In the latter case a 10% solution of rosin in toluol is used. Castor oil which has 25%–40% of its weight distilled off at atmospheric pressure forms a gel which may be treated by this method. Varnish gels made by drying or baking oil varnishes including those containing resins made from phenol-formaldehyde resins or glycerine-phthalic anhydride resins, may be redissolved by the present process. These varnishes may be dried in the manner used in preparing scrim oil in the linoleum industry, though higher temperatures are often desirable. In fact every oil gel known may be dispersed by the vapor pressure treatment, although in the case of very highly hardened or gelled oils, higher pressures than the one given in the specific example will probably be necessary. The resulting solutions may be used directly as vehicles for paints, particularly baking enamels. Or the solutions may be incorporated in nitrocellulose lacquers, vinyl ester lacquers, or oil varnishes. They may also be used as raw materials for synthetic resins or may be subjected to esterification or other chemical reactions to improve their nature. It is generally desirable to subject the solutions obtained by this process to further treatment. This consists of applying heat to the residue left after the evaporation or removal of the dispersing agents or solvents. The heat reaction becomes very rapid at 460° F. and the gel is transformed to an infusible, insoluble solid when oxidized linseed or China-wood oils are used. The reaction is carried out at a lower temperature than 300° F. to avoid discoloration and decomposition. It is desirable in most cases to stop the reaction before the insoluble, infusible state is reached. This may be done by cutting with solvent at the proper time. This treatment very greatly increases the resistance of the oil to alkalies or aqueous liquids. The length of time and the temperature required to form the insoluble infusible form depend on the nature of the original oil. With highly oxidized linseed and China-wood oils the time required to make this form is from five to fifteen minutes at 420° F. At lower temperatures the time increases. Reactive agents as phenols or reactive anti-oxidants up to 5% by weight of the oil may be incorporated with the oil before this hardening process. The addition of resins during or before the cooking reduces the viscosity of the gel solutions in most cases. Glycerine may be added to esterify the free acids.

It is important during the heat treatment to prevent the oil gel residues from being darkened by contact with the oxygen in the air, while they are at elevated temperatures. Carbon dioxide may be employed advantageously for this purpose.

The type of apparatus used in this heat treatment may best be understood by having reference to the accompanying drawing, in which: 1 represents an aluminum reaction vessel of a suitable size, which is generally about 54 inches high and 15 inches inside diameter, partially surrounded by a superheated steam or hot oil jacket 2, equipped with steam or hot oil supply pipe 3 having control valve 4 and steam or hot oil discharge pipe 5 having control valve 6. The reaction vessel is equipped with an agitator consisting of shaft 7 and blades 8, the shaft passing through a stuffing box 9 at the upper end of the reaction vessel and being driven through the agency of drive wheel 10 by a belt or other suitable connector from a source of power, not shown. The reaction vessel is equipped with valved pipes 11 and 12 for the introduction of carbon dioxide and solvents, respectively, with a vertical aluminum pipe 13, about 12 feet long and ¾ inch inside diameter with its upper end open, comprising a reflux condenser, and with a residuum draw off pipe 14 provided with valve 15. Shaft 7 is supported by a thrust bearing 9' at the bottom of vessel 1.

A specific example of a treatment as carried out in the above apparatus is as follows. One hundred pounds of the residue left after evaporating or otherwise removing the solvents from an oil gel dispersion is placed in reaction vessel 1 and heating fluid admitted to jacket 2. This is in contrast to heating the vessel by direct fire, which would cause the walls of the vessel to become so undesirably hot that the oil residue would tend to be cracked or decomposed by the hot spots. The top of the vessel is enclosed and the reflux condenser 13 is air cooled. A slow stream of carbon dioxide gas is admitted through pipe 11 and the contents of the vessel are then heated to 420° F. in one-half hour. If the gel residue is derived from scrim oil, the residue will be transformed to insoluble, infusible form in less than one-half hour at that temperature. To secure the soluble, but infusible form, the temperature is held at 420° F. for from three to fifteen minutes, then five gallons of butanol are added slowly through pipe 12. The agitator is kept in motion from the start of the treatment. The solution produced may be reduced further with solvents according to the body desired. After cooling it is ready for use.

Since heat treatment tends to make an insoluble, infusible form, it suggests the use of these dispersed oil gels as moulding plastics.

The dispersed oil gel may be caused to regel by evaporation, then further oxidizing or hardening it and redispersing it as before. This second dispersion will then evaporate leaving a film behind free from tackiness, and of increased hardness, so tat very quick drying protective coatings may be made from it. It is often desirable to incorporate pigment into the dispersion before allowing it to regel and subjecting it to the oxidizing and baking action. If the oil has been dried tack free in the "secondary oxidation" it will produce a paint that dries tack free as soon as the solvents evaporate. However, if the oil does not receive this secondary oxidation (the exposure of the dispersed oil on the scrim), it will leave a film that becomes free from tack only after 24 hours or so, unless it is baked at a temperature of 150° F. The reason for this is that on the first oxidation of the oil about 60% of the oil is converted into the solid phase (this example refers to scrim oil) leaving 40% liquid. The process of dissolving the oil under pressure squeezes this liquid phase out of the solid phase where it has been held as water is held by a sponge. Then when the dissolved oil film is formed, the liquid phase remains on the surface of the solid phase until the liquid phase is either changed to the solid phase by oxidation or other chemical action, or the liquid phase is again taken up by the solid phase. As long as the liquid phase is outside of the solid phase, the oil film or paint remains tacky. If, however, this tacky film is exposed to the action of air and heat, the tackiness is lost as explained above, and on redissolving the film of oil, the film deposited from this second solution will be tack free. In the oxidation of oil in the usual manner, the solid phase takes up the liquid phase before the liquid phase is thoroughly oxidized, and when it is held by the solid phase, the liquid phase cannot be readily oxidized. But by breaking up this sponge-like action of the solid phase by redispersing the original oil gel, the liquid phase is again left on the outside of the solid phase and can be further oxidized, thus attaining a degree of oxidation which cannot be obtained by the ordinary case of exposing the oil to oxidation but once.

Since oils which have undergone "secondary oxidation" so that they are tack free, have been oxidized as much as is necessary, it is generally desirable to stop further oxidation so as to increase the durability of the paint, varnish, etc. This opens an opportunity that is denied in the present day process of making paints, etc., for when an oil paint is applied and oxidation takes place after application, there is no way of keeping that oxidation from continuing until the oil film is oxidized so far that it eventually "burns up". But since with the present process the oil is oxidized first and then applied, it is possible to add anti-oxidants and modifiers to the oil after it is oxidized but before it is applied as paint, varnish, linoleum, etc. Examples of such modifiers and anti-oxidants are: phenol, thioglycollic acid, dibutyl phthalate, and waxes.

A particular application for the dissolved oil gels, especially linoleum cement gels, is as a vehicle for linoleum ingredients, the material being applied to the burlap or other support by means of sprays. These sprays may contain different colors and be arranged to overlap so that color blending and shading is secured which cannot be secured in the present day linoleum. The linoleum may be subsequently calendered and then cured in the regular manner. A similar mixture containing no woodflour or cork may be sprayed onto bituminous saturated felt forming a layer much thicker than the layer of paint now used, since the material being already well dried, will harden in a much thicker layer than the regular oil paints.

A specific example of the application of the dissolved oil gels as a vehicle for linoleum ingredients is as follows:

1 part by weight of scrim oil (known in the linoleum trade) and 4–7 parts by weight of dispersing medium, i. e. toluol, acetone, and carbon tetrachloride are placed in a closed vessel and heated to 230° F. for from 48 to 72 hours, until solution takes place. The air is expelled from the vessel before the cooking starts. To the resulting solution is added 0.5% of lead metal as fused lead resinate and allowed to dissolve. The solution is then brought to a suitable viscosity (about 2 poises) by adding or distilling off dispersing agent and is flooded onto scrim cloth as is done with the "flooding oil" known to the linoleum industry. Successive floodings are employed to build up a final layer of oil ½ to ¾ inch thick. The temperature may be run as high as 160° F., though 120° F. is more usually employed. The resulting solidified oil is redissolved in a manner similar to that used with the original scrim oil, though more stirring and a much shorter cooking period are desirable, an hour or two being sufficient in many cases. This second solution may be used as such as an ingredient in paints, varnishes, lacquers and such protective coatings, or the solvents may be distilled off and the residue used as a plastic, or cement for linoleum when combined with resins.

The present process differs from any prior art processes wherein the starting material is linoleum scrap, used to produce linoleum cement by the application of dispersing agents under pressure, in that in such prior art processes, for example, that described in U. S. Patent 1,480,473, Scholz, the linoleum scrap contains wood flour, cork, and rosin, which contain impurities as water soluble materials and coloring matter which are harmful in a paint, varnish, or other coating composition, whereas, in the present invention, linoleum scrap is not employed but only pure oil gels.

Throughout the specification and claims, the expression "pure oil gels" is to be understood as meaning oil gels formed by initial drying processes from pure drying oils, and containing no other ingredients than the oxidized or modified oil itself, thereby excluding any such gels as those formed from linoleum scrap or like materials containing water soluble materials, coloring matter, or other impurities harmful in paints or varnishes.

Also, in the specification and claims, the term "dispersion" is to be taken as including all liquid mixtures of carrier and secondary material wherein the two are so thoroughly intermingled as to make discrete particles of the secondary material invisible to the naked eye, thereby including true solutions as well as dispersions. The term "dispersing agent" is to be taken to mean a liquid carrier in the nature of either a solvent or a medium for holding colloid particles.

What I claim is:

1. The process of producing a dispersion of oil gel suitable for use as a coating composition which comprises physically treating oil gel from which is excluded linoleum filling substances and other linoleum materials, with a volatile dispersing agent applied under an artificially imposed vapor pressure of the dispersing agent and mechanical pressure applied to the gel and dispersing agent before and after application of vapor pressure, causing the dispersion of oil gel to regel by evaporating the dispersing agent, subjecting the gel to an oxidizing action and then redispersing it in another portion of the dispersing agent.

2. The process of producing a highly oxidized oil gel which comprises physically treating oxidized oil gel from which is excluded linoleum filling substances and other linoleum materials, with a volatile dispersing agent applied under an artificially imposed vapor pressure of the dispersing agent supplemented with mechanical pressure imposed on the gel and dispersing agent, causing the dispersion of the gel to regel and become secondarily oxidized by spreading the dispersion in thin films on a scrim cloth in a tacky condition, and exposing said dispersion thereon to the action of air and heat until the tackiness has substantially disappeared.

3. The process of producing a highly oxidized oil gel which comprises physically treating oxidized oil gel from which is excluded linoleum filling substances and other linoleum materials, with a volatile dispersing agent applied under an artificially imposed vapor pressure of the dispersing agent and mechanical pressure applied to the gel and solvent before and after the application of vapor pressure, causing the dispersion of the gel to regel and become secondarily oxidized by spreading the dispersion in thin films on a scrim cloth in a tacky condition, and exposing said dispersion thereon to the action of air and heat until the tackiness has substantially disappeared.

4. In a process of producing a dispersion of oil gel suitable for use as a coating composition the step comprising physically subjecting a mechanical mixture of oil gel and water to heat and pressure.

5. A process of treating an oil gel, which process comprises treating oil gel from which is excluded linoleum filling substances and other linoleum materials, with a volatile dispersing agent under pressure thereby producing a dispersion of the gel, evaporating the dispersing agent from the gel, and subjecting the resultant residue to heat treatment not less than 300° F. and not greater than about 460° F., in an atmosphere of carbon dioxide and stopping the heat treatment before the insoluble, infusible form has been reached.

6. A process of treating an oil gel, which process comprises treating oil gel from which is excluded linoleum filling substances and other linoleum materials with a volatile dispersing agent applied under an artificially imposed vapor pressure of the dispersing agent supplemented with mechanical pressure imposed on the gel and dispersing agent, thereby producing a dispersion of the gel, evaporating the dispersing agent, and subjecting the resulting residue to heat treatment not less than 300° F. and not greater than about 460° F. in an atmosphere of carbon dioxide, and stopping the heat treatment before the insoluble, infusible form has been reached.

7. A process of treating an oil gel, which process comprises treating oil gel from which is excluded linoleum filling substances and other linoleum materials, with a volatile dispersing agent applied by heating the gel and dispersing agent together in an enclosed space until a vapor pressure of about four atmospheres has developed, thereby producing a dispersion of the gel, evaporating the dispersing agent from the gel, and subjecting the resultant residue to uniformly distributed heat treatment for about one-half hour while raising the temperature of the material to about 420° F., in an atmosphere of carbon dioxide and stopping the heat treatment before the insoluble, infusible form has been reached.

8. A process of treating an oil gel, which process comprises treating oil gel from which is excluded linoleum filling substances and other linoleum materials, with a volatile dispersing agent applied by heating the gel and dispersing agent together in an enclosed space until a vapor pressure of about four atmospheres has developed, thereby producing a dispersion of the gel, evaporating the dispersing agent from the gel and subjecting the resultant residue to uniformly distributed heat treatment for about one-half hour while raising the temperature of the material to about 420° F., in an atmosphere of carbon dioxide holding the temperature at about 420° F. for a few minutes, then slowly incorporating therewith a solvent for the gel.

9. The process of producing a liquid dispersion of oil gel suitable for use as a coating composition which comprises treating a fatty oil to form an oil gel, physically treating the oil gel from which is excluded linoleum filling substances and other linoleum materials, with a volatile dispersing medium applied under an artificially imposed vapor pressure of the dispersing medium, and applying mechanical pressure to the gel and dispersing medium before and after application of vapor pressure thereby forming a liquid dispersion of the oil gel.

10. The process of producing a highly oxidized oil gel which comprises oxidizing a drying oil to form an oxidized oil gel, physically treating the oxidized oil gel from which is excluded linoleum filling substances and other linoleum materials with a volatile dispersing medium applied by heating the gel and dispersing medium together in an enclosed space until a vapor pressure of about four atmospheres has developed to thereby form a liquid dispersion of the said oil gel, causing the liquid dispersion of the gel to regel and become secondarily oxidized by spreading the dispersion in thin films on a scrim cloth in a tacky condition, and exposing said dispersion thereon to the action of air and heat until the tackiness has substantially disappeared.

11. A process of producing a dispersion of oil gel, which process comprises treating a fatty oil to form an oil gel, subjecting the oxidized oil gel excluding linoleum filling substances and other linoleum materials, to heat and pressure in an enclosed space in the presence of vapors of an organic volatile solvent selected from a group consisting of ethyl alcohol-toluol mixtures, ethyl acetate, benzol, ether, acetone, petroleum, and carbon tetrachloride without chemically altering the oil gel materially, the said solvent and gel being proportioned to produce a dispersion in liquid condition upon cooling, and cooling the oil gel and solvent to obtain a product suitable for use as a liquid coating composition.

12. A composition of matter consisting of a liquid physical dispersion of highly oxidized drying oil gel in a volatile dispersing medium selected from a group consisting of ethyl alcohol toluol mixtures, ethyl acetate, benzol, ether, acetone, petroleum distillates and carbon tetrachloride, the weight of the said medium in said dispersion being in excess of the weight of the said oil gel, said dispersion characterized by the fact that the dispersed particles yield a substantially tack-free film after evaporation of the said medium.

13. A composition of matter consisting of a liquid physical dispersion of a highly oxidized drying oil gel in an organic volatile solvent which dispersion is prepared in accordance with the process of claim 1.

14. A composition of matter consisting of a liquid physical dispersion of a modified oil gel in an organic volatile solvent which dispersion is prepared in accordance with the process of claim 8.

JULIAN T. BALDWIN.